United States Patent
Noll

(10) Patent No.: US 9,587,356 B2
(45) Date of Patent: Mar. 7, 2017

(54) ROADWORTHY RAILROAD BALLAST TAMPER APPARATUS

(71) Applicant: Nordco Inc., Oak Creek, WI (US)

(72) Inventor: Donald Christopher Noll, Menomonee Falls, WI (US)

(73) Assignee: NORDCO INC., Oak Creek, WI (US)

( * ) Notice: Subject to any disclaimer, the term of this patent is extended or adjusted under 35 U.S.C. 154(b) by 0 days.

(21) Appl. No.: 14/490,837

(22) Filed: Sep. 19, 2014

(65) Prior Publication Data

US 2015/0083015 A1     Mar. 26, 2015

Related U.S. Application Data

(60) Provisional application No. 61/882,190, filed on Sep. 25, 2013.

(51) Int. Cl.
  *E01B 27/00*  (2006.01)
  *E01B 27/16*  (2006.01)
  *B60F 1/00*   (2006.01)

(52) U.S. Cl.
  CPC .............. *E01B 27/16* (2013.01); *B60F 1/00* (2013.01); *B60F 2301/10* (2013.01)

(58) Field of Classification Search
  CPC .......... E01B 27/16; E01B 27/17; E01B 27/18; B60F 1/00; B60F 2301/10
  See application file for complete search history.

(56) References Cited

U.S. PATENT DOCUMENTS

| | | | | |
|---|---|---|---|---|
| 3,020,858 A | * | 2/1962 | Perkins ................... | B60F 1/00 105/27 |
| 3,130,686 A | * | 4/1964 | Gumprecht ............. | B60F 1/00 105/26.1 |
| 3,433,175 A | * | 3/1969 | Macleod ................ | E01B 27/17 104/7.1 |
| 3,494,297 A | * | 2/1970 | Plasser ................... | E01B 27/12 104/7.2 |
| 4,069,763 A | * | 1/1978 | Theurer ................. | E01B 27/16 104/12 |
| 4,103,622 A | * | 8/1978 | Theurer ................. | B60F 1/04 104/12 |

(Continued)

OTHER PUBLICATIONS

Canadian Office Action from Corresponding Candian Application No. 2,865,099, mailed Dec. 4, 2015.

*Primary Examiner* — Jason C Smith

(74) *Attorney, Agent, or Firm* — Greer, Burns & Crain, Ltd.

(57) ABSTRACT

A tamper apparatus configured for being transportable upon a road is provided. A chassis is configured for supporting the tamper apparatus. A retractable turntable unit is connected to the chassis. The turntable unit has a generally quadrilateral configuration with side walls, and is rotatably attached at substantially a center of mass of the tamper apparatus. A tamping unit is connected to the chassis and configured for performing packing of a ballast under railroad ties for correcting cross and longitudinal levels of a pair of rails of a railroad track. A buggy lift assembly is removably attached to the chassis and configured for providing track alignment of the rails. At least one set of retractable rail wheels is connected to the chassis such that the chassis is towable by an automobile.

21 Claims, 16 Drawing Sheets

(56) References Cited

U.S. PATENT DOCUMENTS

| | | | | |
|---|---|---|---|---|
| 4,179,997 A | * | 12/1979 | Kirwan | B60F 1/00 105/159 |
| 4,221,169 A | * | 9/1980 | Theurer | E01B 27/16 104/10 |
| 4,520,735 A | * | 6/1985 | Field | B60F 1/043 104/12 |
| 4,703,568 A | * | 11/1987 | Theurer | E01B 29/00 104/12 |
| 4,928,599 A | * | 5/1990 | Hansmann | E01B 27/17 104/12 |
| 5,090,329 A | * | 2/1992 | Theurer | E01B 27/17 104/7.1 |
| 2015/0083015 A1 | * | 3/2015 | Noll | B60F 1/00 104/12 |
| 2015/0107482 A1 | * | 4/2015 | Ergen | E01B 27/16 104/12 |

* cited by examiner

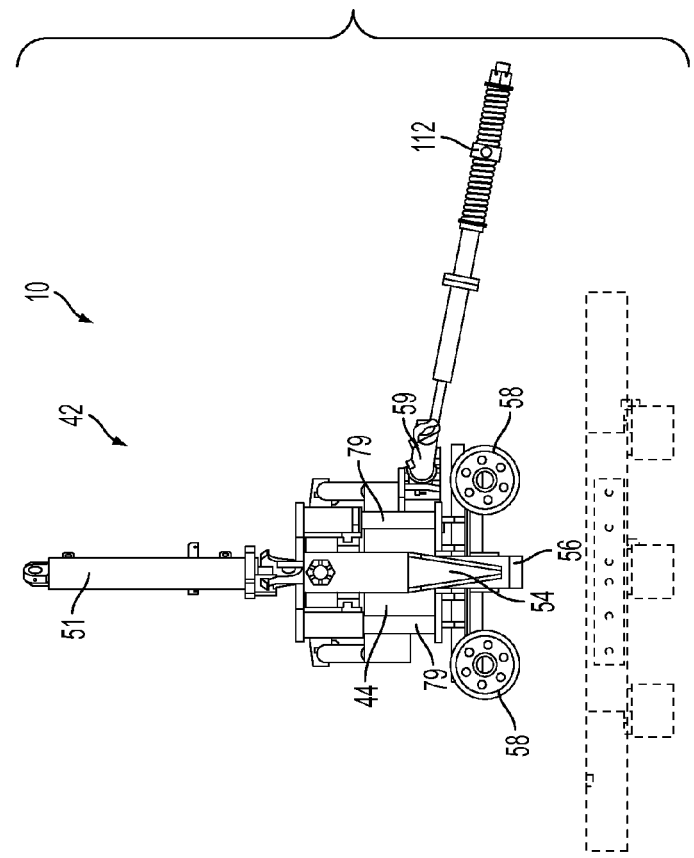
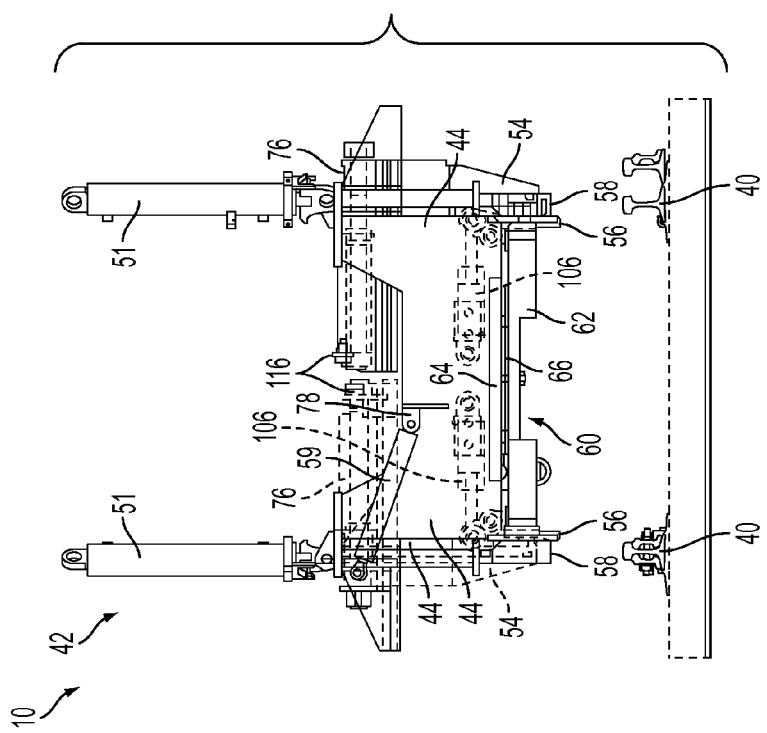
FIG. 3B
FIG. 3A

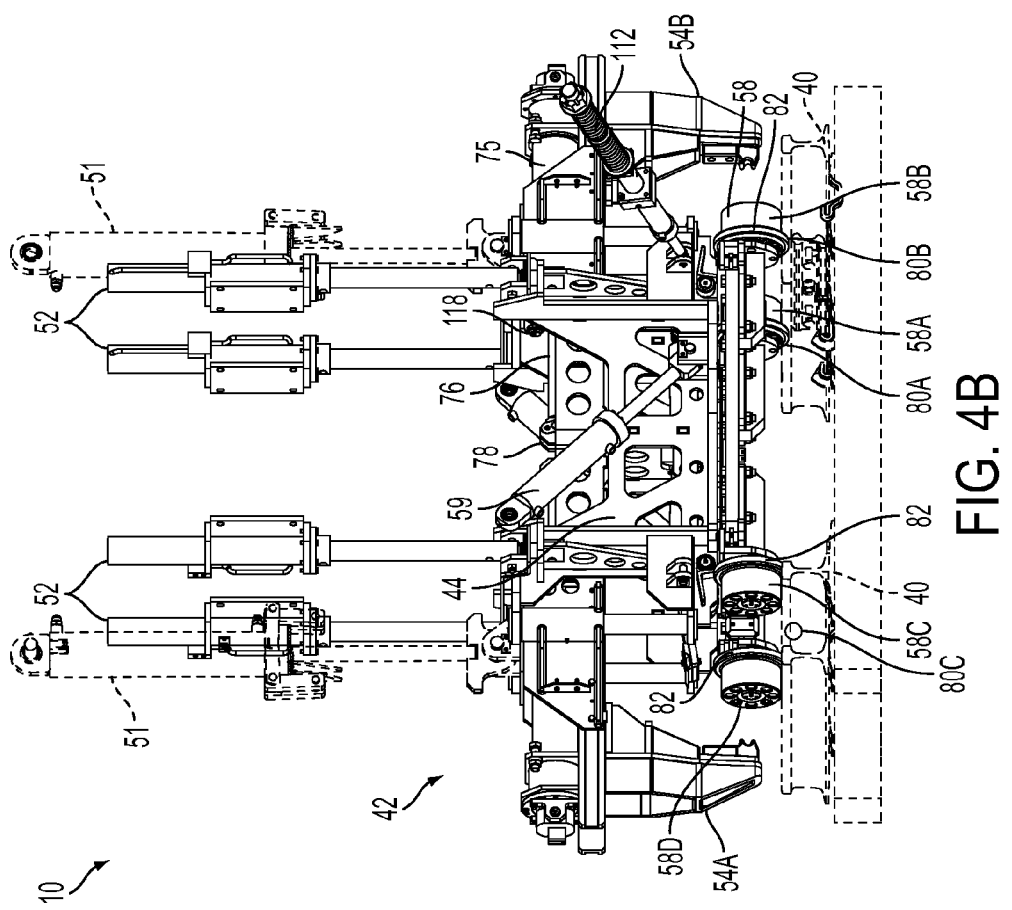

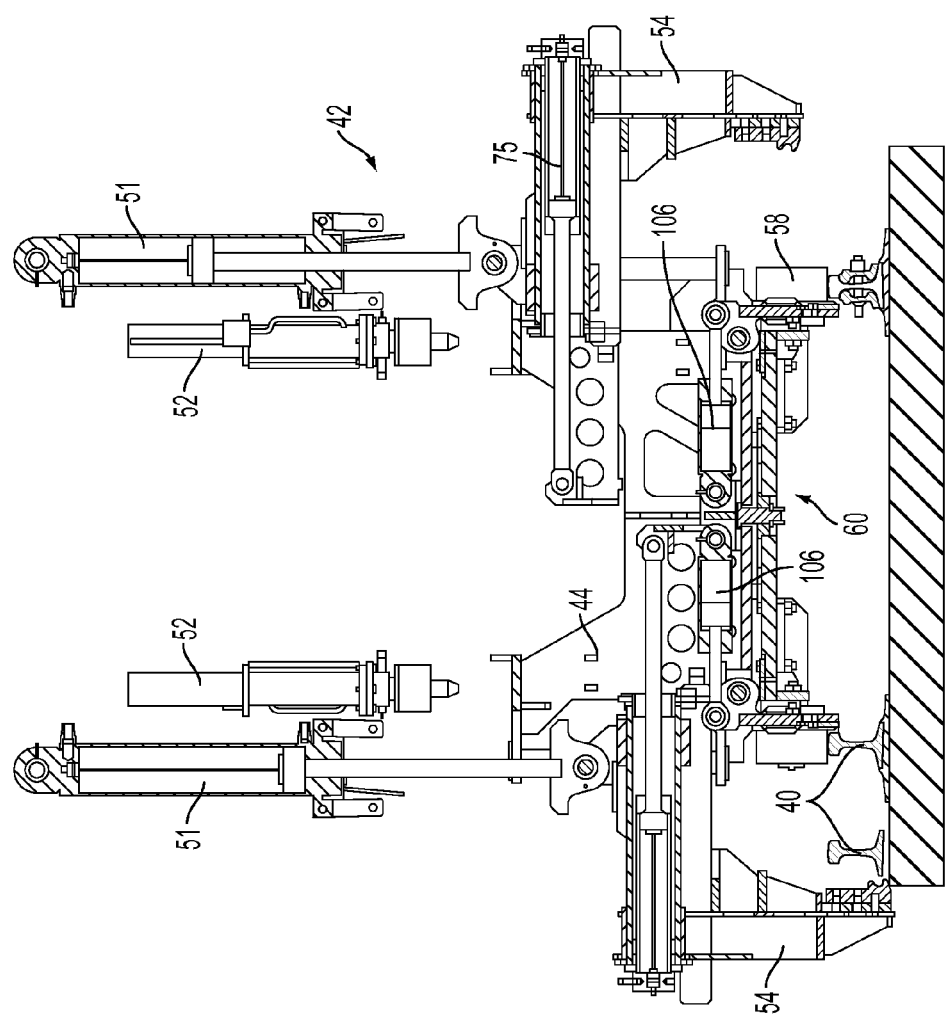

ROADWORTHY RAILROAD BALLAST TAMPER APPARATUS

CROSS-REFERENCE

This application claims priority under 35 USC 119(e) from U.S. Provisional Application Ser. No. 61/882,190 filed Sep. 25, 2013.

BACKGROUND

The present disclosure relates generally to a ballast tamper for manipulating track ballast under railroad ties and correcting alignment of railroad tracks. More particularly, the present disclosure relates to a railroad right of way maintenance system providing a ballast tamping machine being transportable on a highway and easily converted from road travel to rail travel.

Due to natural factors, such as floods, hurricanes, tornadoes, or seasonal ground shifting, as well as regular rail maintenance schedules, it is often necessary to correct the vertical and/or horizontal alignment of railroad tracks by manipulating the track ballast supporting railroad ties using a method known as tamping. Conventional tamping machines include vibrating elongate, rigid tamping arms, also referred to as tamping tools. The tamping tools are forced into the ballast, on each side of the railroad tie, and vibrate at a given frequency within the ballast. Such vibration, in addition to movement of the tamper tool work head causes movement of the ballast to support ties, and the corresponding track at a designated alignment, thereby leveling the railroad tracks.

However, conventional tamper machines are very heavy, long, and overly bulky for highway transportation. Further, even if the tamper machine can be transportable using, for example, a large trailer, special oversize permits and requirements are required by the U.S. Department of Transportation for carrying the tamper machine on a highway. Moreover, once the machine reaches its destination, a heavy-duty lifting machine, such as a crane, is needed to move the tamper onto the railway track for operation. Accordingly, the transportation of the conventional tamper machine is inconvenient and cumbersome, and incurs high shipping costs due to the difficulties in transporting.

SUMMARY

A roadworthy tamper apparatus is provided, which features a chassis having at least one tamper workhead, at least one turntable, at least one reference projector buggy, and at least one set of retractable rail wheels, all mounted to the main chassis that is towable as a trailer by a standard semi tractor truck. The present chassis is constructed and arranged so that it meets standard Department of Transportation height and weight regulations for towed trailers, and does not require special Oversize or Overweight permits. The machine has a width of less than or equal to 96 inches, a length of less than or equal to 53 feet, a height of less than 13 feet, six inches, and a weight of less than 80,000 pounds when combined with a tractor. The stand alone weight for the present machine is in the range of 62,000-64,000 pounds.

Further, due to the tamper apparatus's reduced width, length, and weight, and a turntable unit, no crane is necessary for placing the apparatus on the track for operation. A semi-truck tractor conveniently hauls the tamper apparatus and delivers it to a destination, such as a railroad crossing. In use, the tamper apparatus is lowered and released on the railroad track so that wheels of the turntable unit are engaged on the rails.

Included on the present tamper apparatus chassis is a turntable unit being constructed and arranged to move from a stowed or high speed rail transport position to a transition position, and to working position. Once the unit reaches a highway/rail junction, the chassis is positioned so that the turntable unit is above the railroad track. Then the turntable is lowered to the transition position, where the turntable is rotatable by a user so that wheels of the turntable are operatively engaged on the rails of the track. Next, the chassis is elevated off the highway and relative to the turntable. A bearing in the turntable is configured to allow manual rotation of the elevated chassis until a longitudinal axis of the chassis is generally parallel to the rails of the track. The operator then lowers the chassis relative to the turntable so that rail wheels of the chassis engage the track. When the tamper apparatus travels to a location needing tamping, the turntable is then lifted relative to the chassis into the stowed position. Once the apparatus reaches the location requiring tamping and rail alignment, the turntable is lowered back into engagement with the track while the apparatus is placed in operation on a railroad track to perform tamping where needed. Included in the turntable unit are rail lift cylinders for raising the chassis relative to the turntable and vice versa, hook members for gripping and aligning rails, biasing clamp members for biasing against rails of the track for stabilizing the turntable during the rail alignment process, wheel locks for fixing the rail wheels in place, and a turntable assembly for rotating the tamper apparatus on a railroad track.

Dual purpose bias clamp members work with rail wheels of the turntable unit for biasing against the rail for holding the turntable in place while the chassis is rotated into position and lowered to an operational position on the track, and also hold a lower turntable base in place during the tamping operation, as well as during transportation along the highway. Also, during the transition mode, the bias clamps are raised to allow rotation of the turntable. The bias clamps are associated with wheel locks which further hold the rail wheels of the turntable in position during the relative rotation of the chassis, and during rail lifting and alignment. Accordingly, transitioning of the present apparatus from traveling on the road to working on the railroad track is easily accomplished, and further performed without resorting to additional heavy equipment.

In operation, the chassis is transitioned from highway movement to a work mode using the turntable as described above. Once the main chassis is aligned with the track, and locked in position relative to the turntable, the tamper apparatus moves along the track, collecting track alignment data. Once a section of track is discovered that requires alignment, the apparatus moves back over the misaligned rail, and a process known as indexing is begun, where the ballast supporting each misaligned tie is subject to tamping. Once the chassis is in position, the main chassis brakes are set, and the biasing clamps press rail wheels of the turntable against an inner surface of a reference rail on one side of the machine.

On the opposite side or opposite rail from the above-identified turntable rail wheels, the respective biasing clamp is pressurized to exert pressure against the corresponding inner surface of the rail. Hydraulically controlled hook members are manipulated to grasp and lift the corresponding rail requiring alignment to a desired position. Next, the tamper unit is energized for moving ballast to support the respective tie so that the raised rail maintains the desired position held by the hook member. After completion of the tamping and rail alignment process, the tamper tools are moved to a travel position, the wheel locks are released, as are the hooks and bias clamps. The tamper apparatus is then moved to the next section of rail needing alignment.

In one embodiment, a tamper apparatus configured for being transportable upon a road is provided. A chassis is configured for supporting the tamper apparatus. A retractable turntable unit is connected to the chassis. The turntable unit has a generally quadrilateral configuration with side walls, and is rotatably attached at substantially a center of mass of the tamper apparatus. A tamping unit is connected to the chassis and configured for performing packing of a ballast under railroad ties for correcting cross and longitudinal levels of a pair of rails of a railroad track. A buggy lift assembly is removably attached to the chassis and configured for providing track alignment of the rails. At least one set of retractable rail wheels is connected to the chassis such that the chassis is towable by an automobile.

In another embodiment, a roadworthy tamper apparatus is provided, and includes a turntable unit having a generally quadrilateral configuration with a plurality of side walls for adjustably manually rotating the tamper apparatus relative to the turntable unit while the tamper apparatus is placed in operation on a railroad track. A chassis holds the turntable unit at substantially a center of mass of the tamper apparatus, and the center of mass is located at an upper portion of the chassis for manually horizontally rotating the tamper apparatus relative to the turntable unit.

BRIEF DESCRIPTION OF THE DRAWINGS

FIG. 3A is a fragmentary front view of the present turntable unit in the travel mode;

FIG. 3B is a fragmentary side elevation of the present turntable unit shown in the travel mode;

FIG. 4B is a fragmentary perspective view of the turntable unit of FIG. 4A shown in a turntable lift mode;

FIG. 8C is a fragmentary vertical cross-section view of the turntable unit of FIG. 8A shown in a work position, featuring the turntable cylinders uncoupled from the turntable unit.

DETAILED DESCRIPTION

Figure 1:
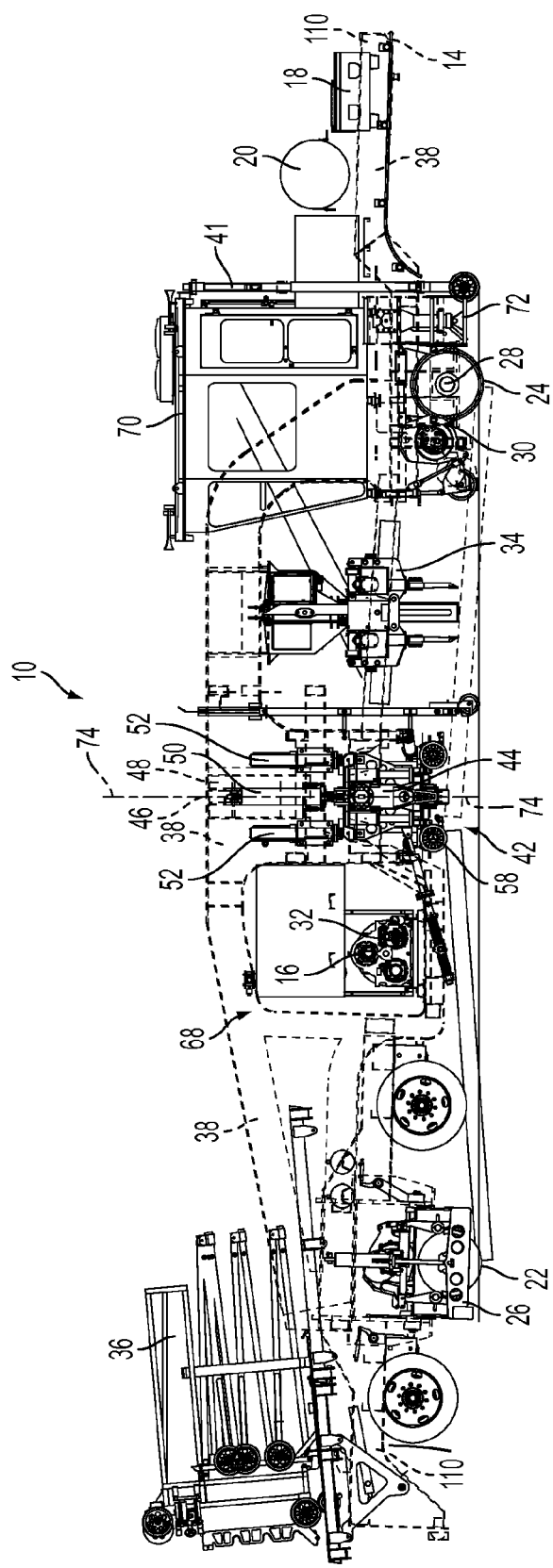
FIG. 1 is a side view of the present tamper apparatus.
Figure 2A:
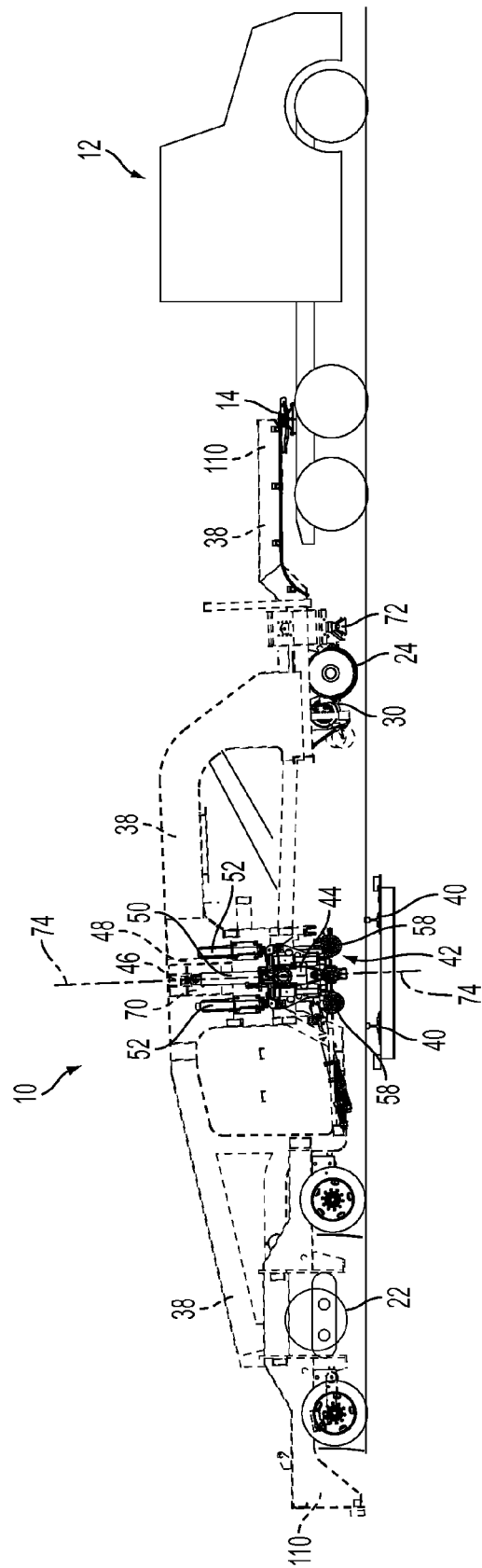
FIG. 2A is a fragmentary side view of the tamper apparatus of FIG. 1 connected to a semi-truck in a travel mode.
Figure 2B:
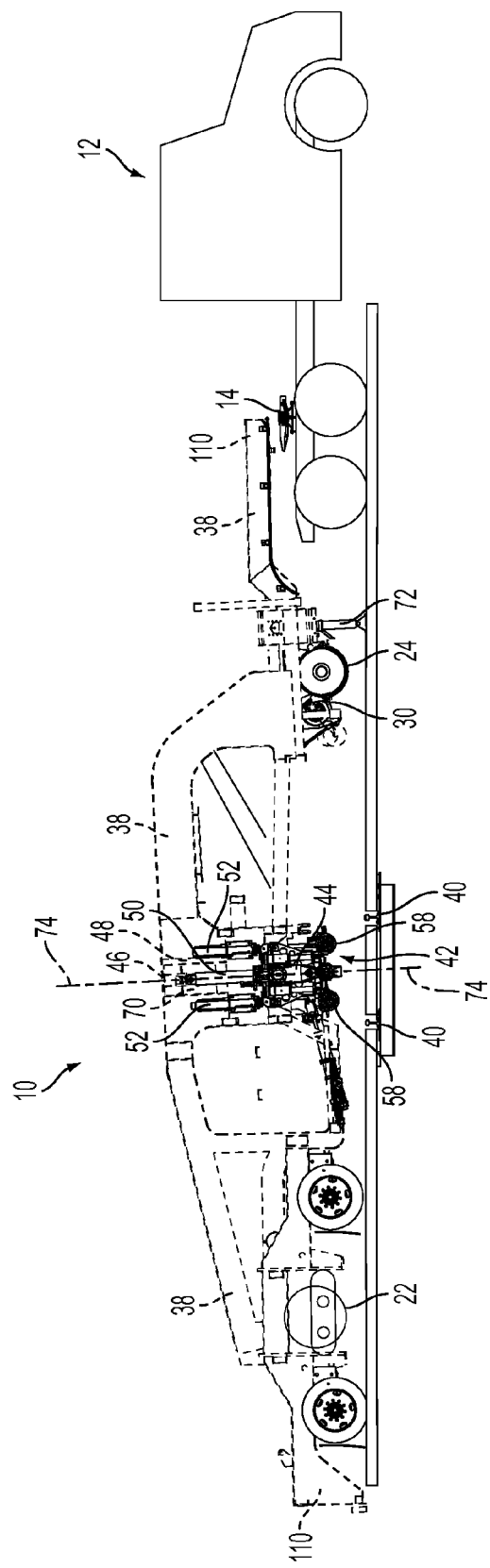
FIG. 2B is a fragmentary side view of the tamper apparatus of FIG. 1 disconnected from the semi-truck in a rail crossing mode.
Figure 2C:
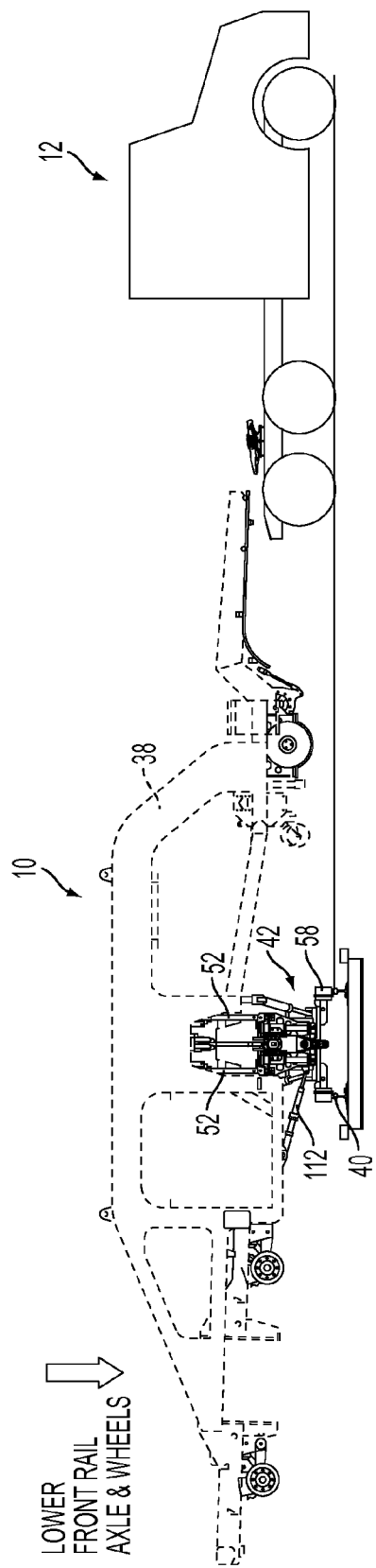
FIG. 2C is a fragmentary side view of the tamper apparatus of FIG. 1 with the turntable shown engaged on the rail and the chassis shown elevated relative to the turntable.

Referring now to FIGS. 1-2C, a tamper apparatus, generally designated 10, is shown mounted for towing by a semi-truck tractor, generally designated 12. As is well known in the art, the tamper apparatus 10 is designed to be self-propelled or towed as a separate unit alone or as part of a railway maintenance gang along a railroad track. One aspect of the present tamper apparatus 10 is that the tamper apparatus can be conveniently and directly towed by the semi-truck tractor 12 having a hitch assembly 14 along the highway to a destination site without requiring shipment strictly on the railroad track or over the road on an oversize highway trailer requiring special oversize permits. The machine 10 has a width of less than or equal to 96 inches, a length of less than or equal to 53 feet, a height of less than 13 feet six inches, and a weight of less than 80,000 pounds when combined with the tractor 12.

For maintenance activities on the track, the tamper apparatus 10 is self-propelled and powered by an engine 16, a battery 18, and a fuel tank 20. It is preferred that a self-contained power source, such as the battery 18, is installed on the tamper apparatus 10, but it is also contemplated that the power source can be obtained from another unit of the railway maintenance gang. The engine 16 provides power to at least one of front-axle wheels 22 and rear-axle wheels 24, allowing the tamper apparatus 10 to propel itself to the work-sites on the railroad track. Preferably, the front-axle wheels 22 are equipped with a floating, retractable axle frame 26, and the rear-axle wheels 24 are fixedly attached to an axle frame 28. The floating axle frame is disclosed in greater detail in commonly-assigned U.S. patent application Ser. No. 14/491,369 entitled PIVOT AXLE FRAME FOR ROADWORTHY RAILROAD BALLAST TAMPER APPARATUS incorporated by reference. While a two-axle tamper apparatus 10 is shown, any number of axle(s) is also contemplated depending on the payload. A separate brake system 30 is installed on the rear-axle wheels 24 to prevent the tamper apparatus 10 from unwanted movement, such as while on a sloped area or when not connected to another railway maintenance unit.

At least one pump 32, preferably hydraulic, is driven by the engine 16 to provide power for various tools associated with the tamper apparatus 10. For example, a ballast tamping unit 34, and a projector buggy lift assembly 36 are removably attached to a chassis 38 of the tamper apparatus 10. The ballast tamping unit drive system is disclosed in further detail in commonly-assigned U.S. patent application Ser. No. 14/491,532 entitled DRIVE FOR RAILROAD BALLAST TAMPER APPARATUS incorporated by reference. The projector buggy lift assembly 36 is described in greater detail in commonly assigned U.S. patent application Ser. No. 14/490,312 entitled RAILWAY REFERENCE MACHINE HAVING A COLLAPSIBLE PROJECTOR ASSEMBLY incorporated by reference. It is contemplated that the engine 16, the battery 18, and the fuel tank 20 are also attached to the chassis 38 at desired locations. During railroad track maintenance, the ballast tamping unit 34 performs packing of the ballast under railroad ties for correcting cross and longitudinal levels of a pair of rails 40 of the railroad track. During the tamping process, the otherwise retracted projector buggy lift assembly 36 extends beyond a corresponding end of the chassis 38 for providing a distant alignment projection point for operation with a rear rail follower 41 (FIG. 1) for track alignment as is well known in the art.

Referring now to FIGS. 1 and 3A-C, a turntable unit, generally designated 42, preferably having a generally quadrilateral configuration with four side walls 44, is rotatably attached at substantially a center of mass 46 of the tamper apparatus 10. Preferably, the turntable unit 42 is retractably connected to an upper portion 48 of the chassis 38 for enabling manual horizontal rotation of the tamper apparatus 10 360 degrees in a plane 50 defined by the chassis 38 relative to a vertical axis, such rotation being relative to the turntable unit 42. Another aspect of the present tamper apparatus 10 is that orienting and positioning of the turntable unit 42 during a transition mode is easily achieved by manually rotating the turntable unit 42 relative to the chassis 38 as the apparatus is lowered to an operational position onto the rails 40.

Included in the turntable unit 42 is at least one rail lift cylinder 51 connected at one end to the chassis 38 and at an opposite end to the side wall 44 for lifting the rails 40 during the work mode. Further included in the turntable unit 42 is at least one and preferably four turntable cylinders 52 each connected at one end to the chassis 38 and at an opposite end to the turntable unit 42 for raising and lowering the turntable unit 42 relative to the chassis 38 and vice versa. At least one hook member 54 is connected to the side wall 44 for holding the rails 40 sufficient for vertical lifting of the rails with the rail lift cylinder(s) 51. At least one clamp member 56 is provided for biasing against auxiliary wheels 58 of the turntable unit 42 sufficient for shifting a track line to the left or to the right under the action of a line cylinder 59. An ability to make corrections for leveling and adjusting the track line requires precise holding and movement of the rails 40 (while tamping the ballast stone) held within the rail hook member 54 and the clamp member 56 without rail slippage or rail roll.

Also included in the turntable unit 42 is a turntable assembly, generally designated 60, having a turntable base 62 and a turntable 64 with at least one bearing 66 disposed between the base and the turntable. As with the turntable unit 42, the base 62 is freely rotatable through 360 degrees. It is preferred that the bearing 66 is a radial ball bearing, but other types of bearings are also contemplated, such as plain bearings or rolling-element bearings.

In operation, the rail lift cylinders 51 and the turntable cylinders are actuated by a fluid power control unit, generally designated 68. As is well known in the art, the unit 68 includes a motor, a pump, a reservoir of hydraulic fluid, at least one control valve (all not shown) and a power supply such as the battery 18. It is contemplated that either end of any cylinder shown and described in the present apparatus can be the rod end, and the other corresponding end will be the blind end. While a double acting cylinder is shown and described, it is contemplated that various fluid powered piston driven assemblies may be implemented with the present disclosure as is known to those skilled in the art.

The turntable cylinders 52 are dimensional for supporting the entire assembled weight of the chassis 38 of the tamper apparatus 10 while being rotated on the rails 40 relative to the turntable unit 42. As described in further detail below, when the tamper apparatus 10 is lowered onto the rails 40, the turntable unit 42 is already engaged on the rails via the auxiliary wheels 58, and the chassis 38 is thus supported as the chassis 38 of the tamper apparatus 10 is rotated into position. After completion of the rotation, the front- and rear-axle wheels 22, 24 are lowered for traveling on the rails 40 of the railroad track, and then the turntable unit 42 is lifted up by the cylinders 52 and stowed away in the position shown in FIGS. 3A-3C.

Referring now to FIGS. 2A-3C, the tamper apparatus 10 is shown in a travel mode and in a rail crossing mode. As best shown in FIGS. 2A and 3A, the travel mode refers to a condition where the tamper apparatus 10 is being towed by the semi-truck 12 on a conventional road, such as a state highway. Notably, the turntable unit 42 and the front-axle wheels 22 are stowed away for ground clearance, and similarly the rear-axle wheels 24 maintain sufficient space from the road surface. In this way, the tamper apparatus 10 becomes roadworthy, suitable for safely being transported on the road. As shown in FIG. 2B, the rail crossing mode refers to a condition where the tamper apparatus 10 is being positioned substantially directly over the railroad track and ready to be lowered for tamper tasks. Specifically, a landing gear 72 is lowered to lift the tamper apparatus 10 from the king pin assembly 14 and unload the tamper apparatus from the semi-truck 12 such that the center of mass 46 of the tamper apparatus 10 is substantially over a centerline 74 defined in-between the rails 40.

Figure 3C:
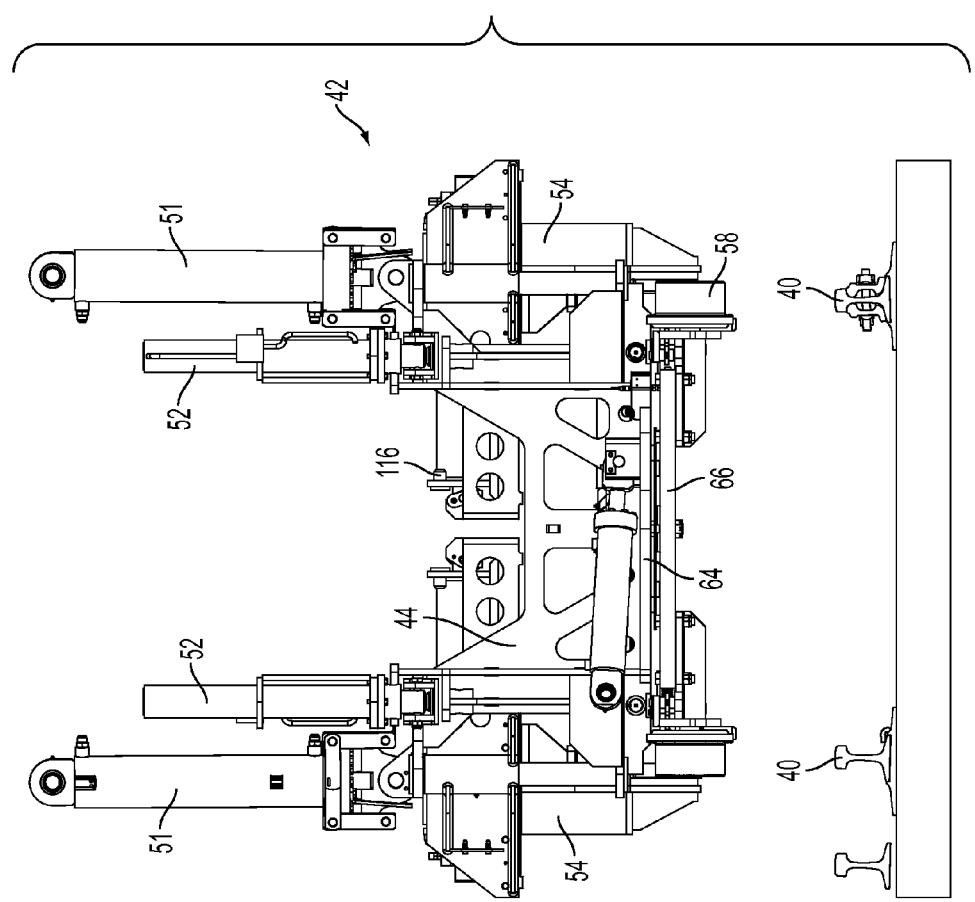
FIG. 3C is a fragmentary front perspective view of the turntable unit of FIG. 3B stowed for a high speed rail travel mode.

Referring now to FIG. 3C, the turntable unit 42 is shown engaged on the rails 40, with the chassis 38 transverse to the rails, as it would appear when the apparatus 10 is transitioning from road travel to rail travel. Also, the chassis 38 is shown elevated relative to the turntable. In this position, since the turntable 42 is located at the center of mass 46 of the chassis 38, the chassis is manually rotatable relative to the turntable unit 42 by the operator. As described in further detail below, in this position, the turntable wheels 58 are clamped in place to prevent rotation, and the chassis 38 is held in the elevated position by the turntable cylinders 52.

Figure 4A:
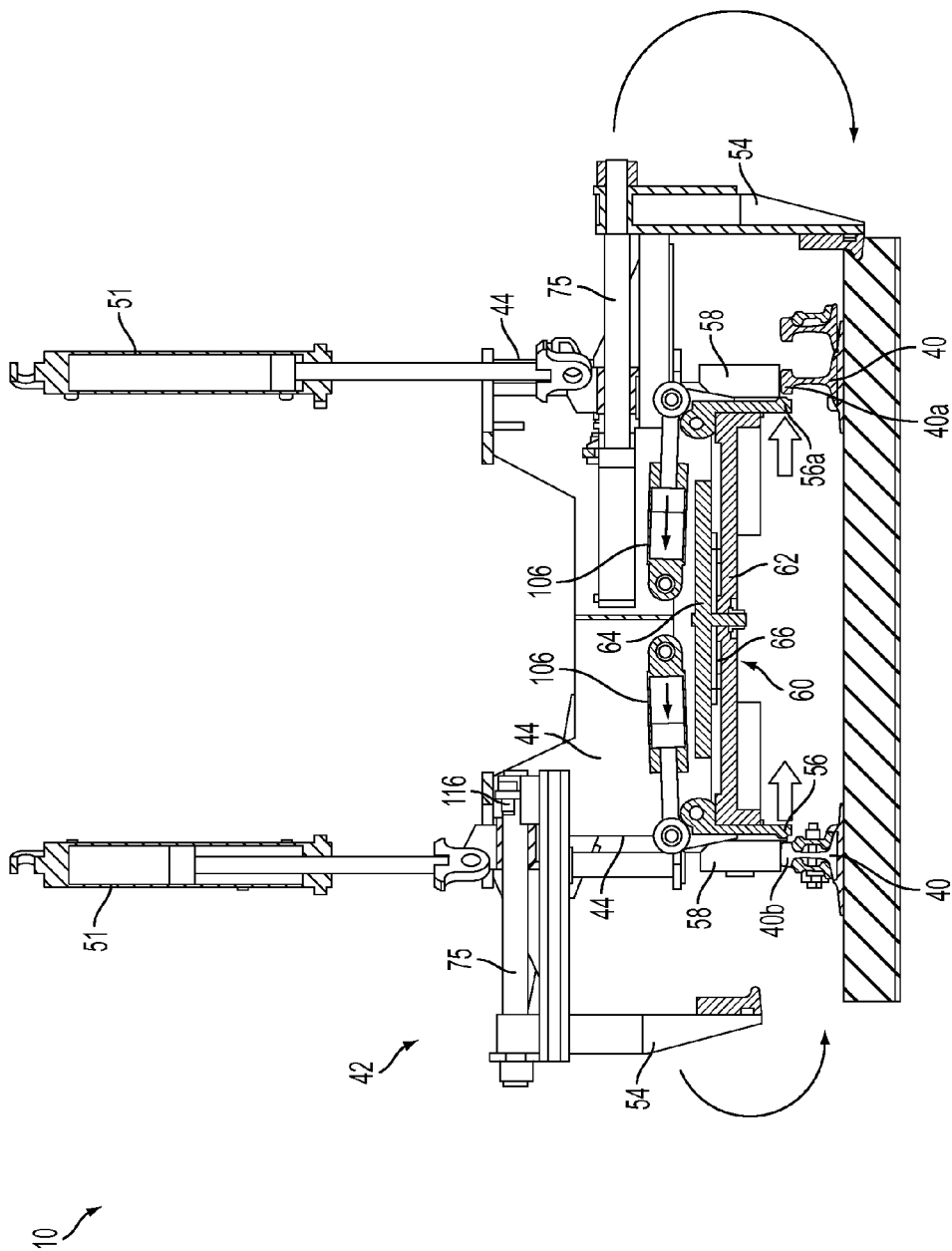
FIG. 4A is a fragmentary partial cross sectional front view of the present turntable unit in a work mode.

Referring now to FIGS. 4A and 8C, the tamper apparatus 10 is shown in a work mode. The work mode refers to a condition where the turntable unit 42 is secured on the rails 40 and is ready to lift and align the rails using the hook members 54, also referred to as hooks. With the turntable cylinder(s) 52 uncoupled from the turn-table unit 42 and pulled upwardly (FIG. 8C), the unit 42 is now raised and lowered solely with the rail lift cylinder(s) 51. Specifically, in the work mode, the turntable unit 42 is secured on the rails 40 by the clamp member 56, which, in a vertical position seen in FIG. 4A, is nested between two spaced, laterally extending brackets on the base 64 and thus prevents rotation of the upper turntable including the sidewalls 44 relative to the base. In addition, one of the clamp members 56a exerts a biasing force against an inner surface of the rail 40a, described in greater detail below. Also, at least one corresponding hook cylinder 76 is connected at one end to a clevis flange or an eyelet 78 disposed on an outer surface of the wall 44 of the turntable unit 42 and at an opposite end to the hook member 54. The hook cylinder 76 selectively moves the hook member 54 reciprocally and laterally relative to the rail 40 for grabbing the rail. Simultaneously, the rail lift cylinders 51 move the hooks 54 vertically relative to vertical guide shafts 79 to create a grabbing and pulling motion defined by the arrows seen in FIG. 4A. The desired final position of the lifted rail 40 is determined by a rail alignment control system (not shown) in the operator cab 70 based on the operation of the buggy 36 and the rear follower 41 as is known in the tamping art. The realigned rail position held by the hook members 54 is supported by the action of the tamping unit 34, which moves ballast to support the lifted rail in the new position.

To secure the turntable unit 42 relative to the rail 40 during this aligning operation, one of the clamp members 56 and two of the auxiliary wheels 58 create three pressure points 80A-C (FIG. 4A). First and second pressure points 80A, 80B are associated with the auxiliary wheels 58A and 58B and created by wheel flanges 82 of the auxiliary wheels. A third pressure point 80C is associated with the clamp member 56. The pressure points 80A and 80B are located on an opposite rail 40 from the rail 40*a* of the pressure point 80C.

Referring now to FIGS. 4-7, in addition to the action of the pressure points 80A-C, during the transition mode, as the chassis 38 is lowered upon the rails 40, the turntable unit 42 is secured on the rails by the action of the clamp member 56. At least one outer center panel flap 84 and at least one outer side panel flap 86 of the clamp member 56 simultaneously pivot downwardly about a shaft 88. Both flaps 84, 86 directly bias not only against a corresponding locking brake bar 90, but also against an outer edge of the turntable base 62.

Figure 5:
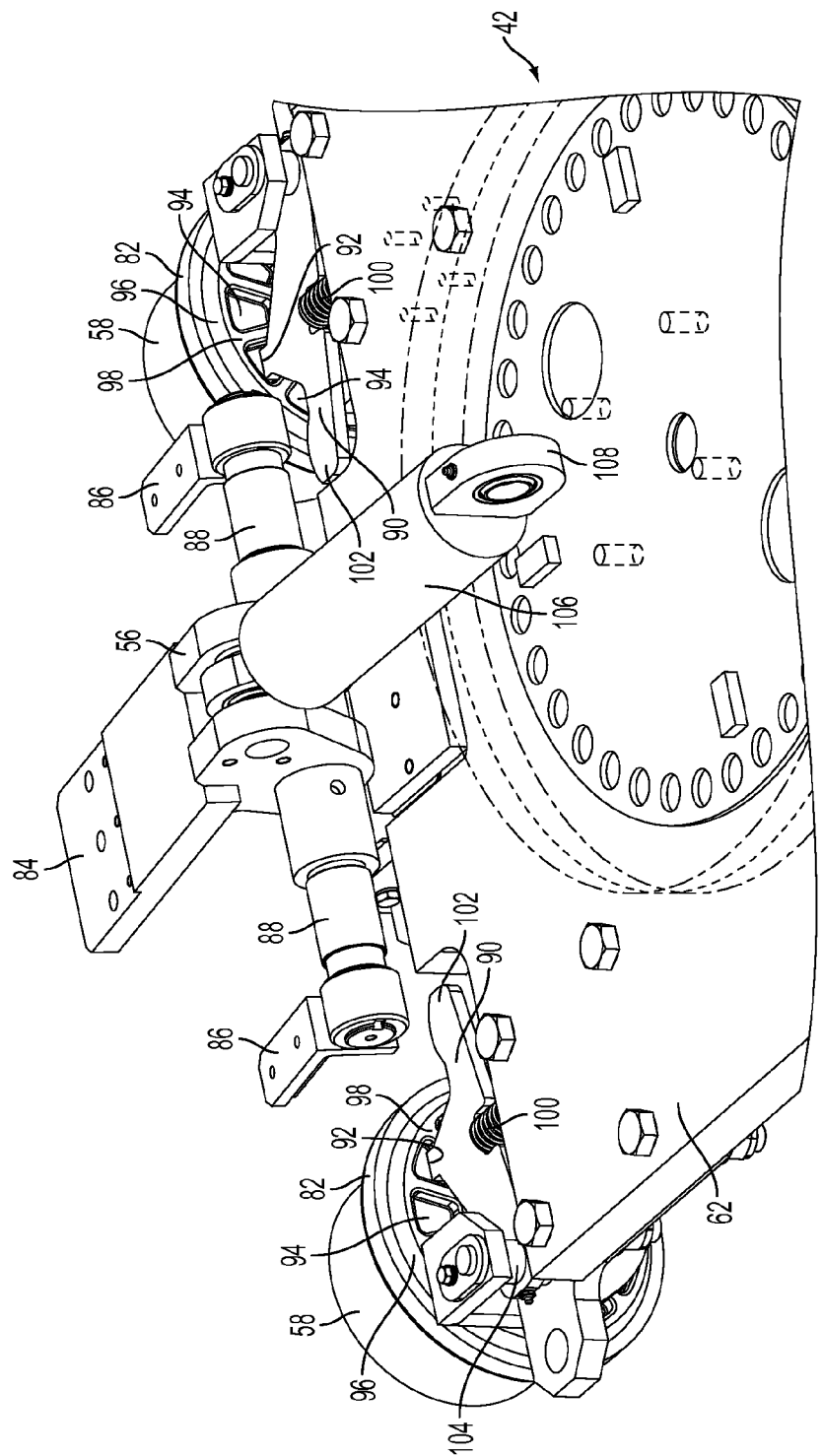
FIG. 5 is a fragmentary rear perspective view of the present bias clamp members in a released position.
Figure 6:
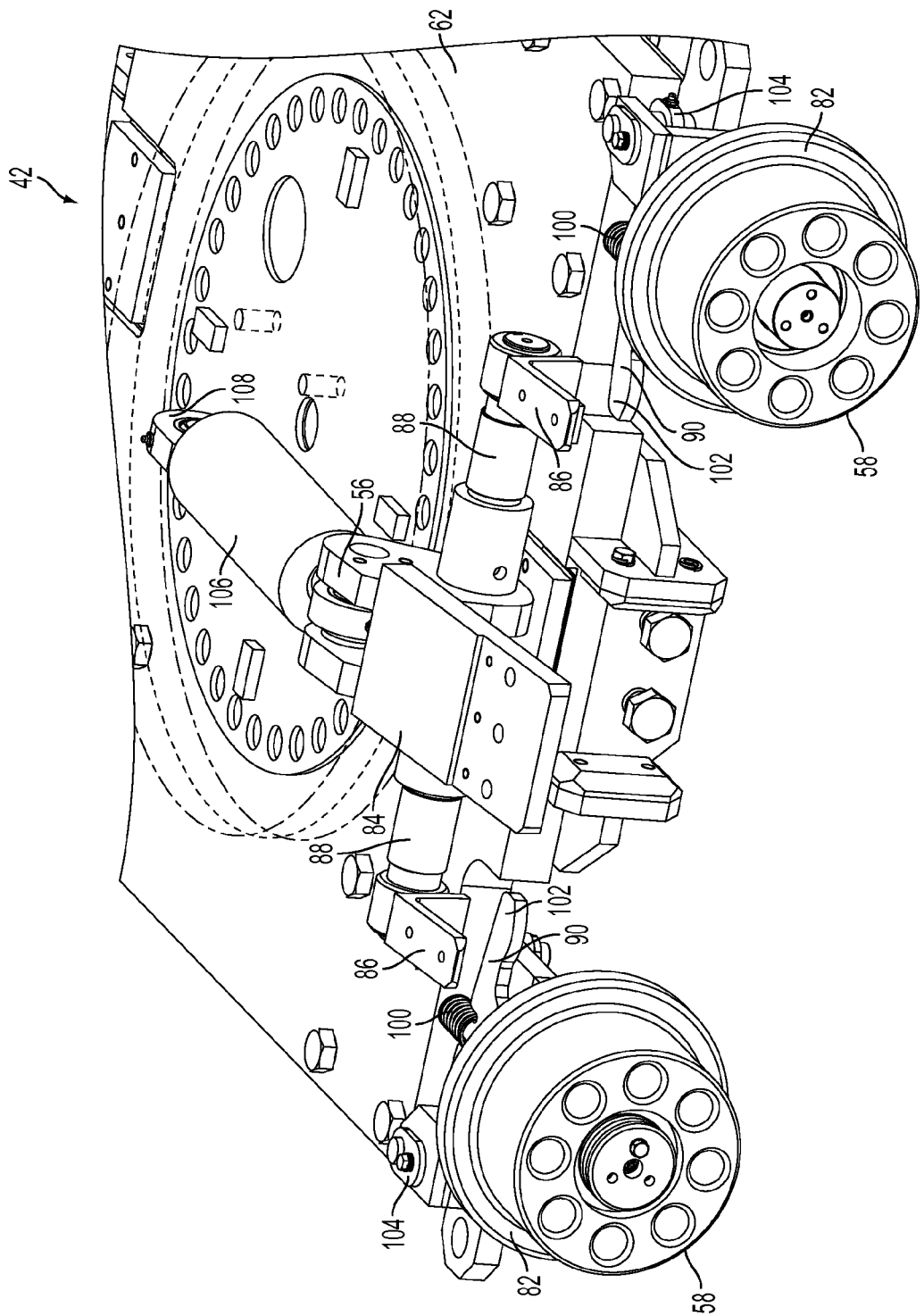
FIG. 6 is a fragmentary front perspective view of the present bias clamp members of FIG. 5.

Specifically, FIGS. 5 and 6 show the clamp member 56 in a released position. The released position refers to a condition where both flaps 84, 86 pivot upwardly about the shaft 88, thereby allowing a protrusion portion 92 of the locking brake bar 90 to be inserted into one of a plurality of slots 94 located on an inner disk 96 of the wheel 58. More specifically, the locking brake bar 90 connected to the turntable base 62 pivotally biases against an outer surface 98 of the inner disk 96 by inserting the protrusion portion 92 into one of the slots 94 under the action of a spring 100 disposed between the base 62 and the brake bar 90. Accordingly, the auxiliary wheels 58 are secured on the rails 40 in preparation of the manual rotation of the chassis 38.

Figure 7:
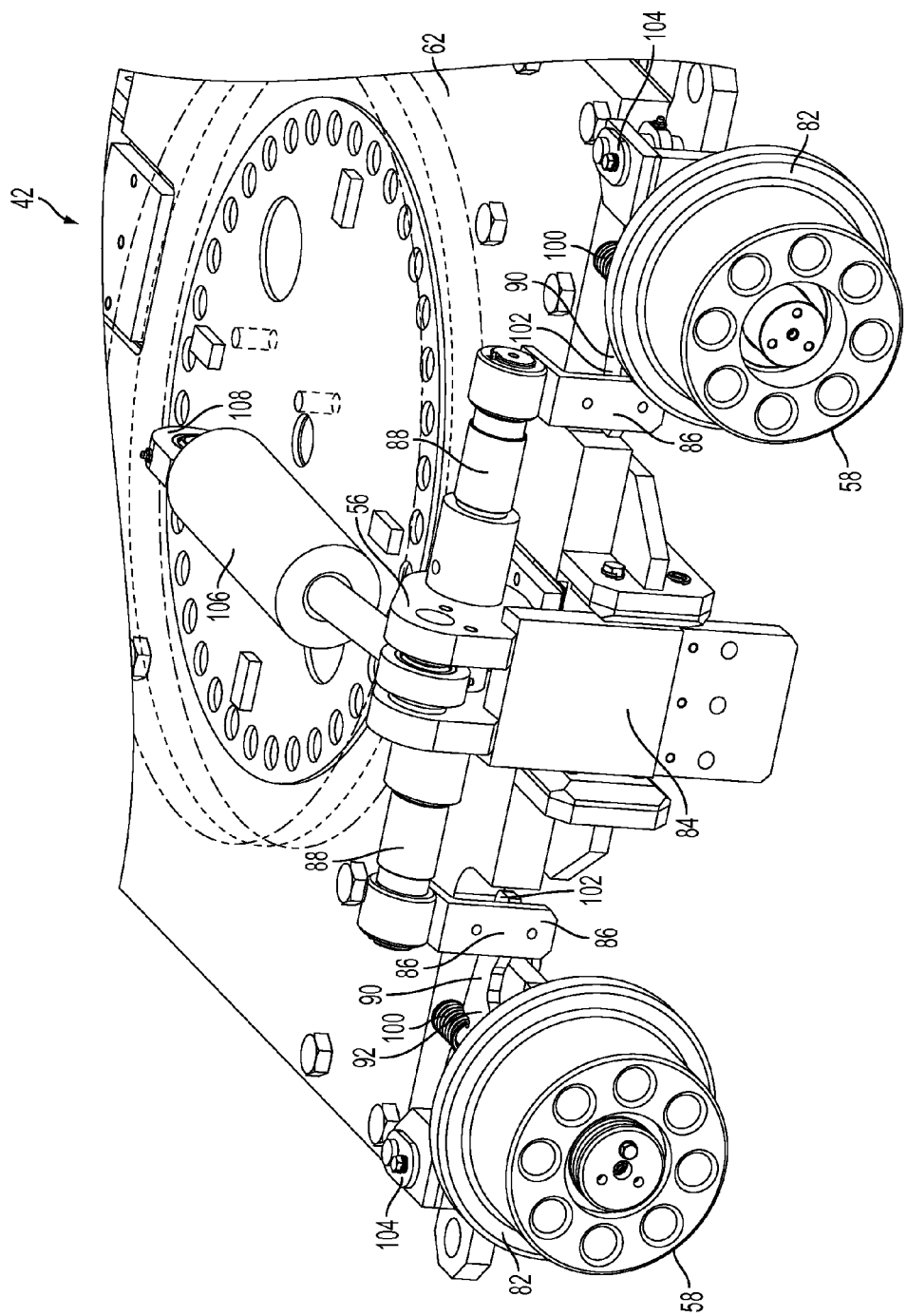
FIG. 7 is a fragmentary front perspective view of the present bias clamp members in a locked position.

FIG. 7 shows the clamp member 56 in a locked position. The locked position refers to a condition where the flaps 84, 86 simultaneously pivot downwardly about the shaft 88, thereby allowing the protrusion portion 92 of the locking brake bar 90 to be withdrawn from the slot 94 (FIG. 5). More specifically, when the side flap 86 pivots downwardly about the shaft 88, the side flap engages one end 102 of the brake bar 90 opposite a pivoting end 104 of the brake bar, overcoming the action of the spring 100. Thus, the protrusion portion 92 is removed from the slot 94, and the wheels 58 become freely rotatable. Simultaneously, the center flap 84 pivotally biases against the outer edge of the base 62 so that the base is secured from lateral and/or radial movement. In summary, when the flaps 84, 86 are in the outwardly extending position, the wheels 58 are locked from rotation by the brake bar 90. This locking action holds the turntable unit 42 in place while the chassis 38 is lowered into position and rotated. Alternatively, when the flaps 84, 86 are in the downwardly extending locked position, the wheels 58 are rotatable, which facilitates the working action of the hook members 54 during rail alignment. During working, the turntable unit 42 is held in place by the pressure points 80A-C discussed above.

Pivoting actions of the flaps 84, 86 are achieved by at least one corresponding clamp cylinder 106 which is connected at one end to a clevis flange or an eyelet 108 disposed on an inner surface of the wall 44, and at an opposite end to the clamp member 56. Selective pressurization of the clamp cylinders 106 activates the clamp members 56 to brake the auxiliary wheels 58 as described above. More specifically, the cylinder 106 pressurizes the flaps 84, 86 to pivot upwardly about the shaft 88 and allows the protrusion portion 92 to be inserted into the slot 94 to lock the corresponding wheels 58 in position. Conversely, the cylinder 106 selectively pressurizes the flaps 84, 86 to pivot downwardly about the shaft 88 and allows the protrusion portion 92 to be withdrawn from the slot 94 to release the wheels 58. The cylinder 106 is also the source of the biasing force exerted by the clamp 56*a* against the rail 40*a* to define the pressure point 80C. While one pair of hook members and one pair of clamp members are described for illustration purposes, any number of hook and clamp members is contemplated. Also, as discussed above, all cylinders shown and described in the present apparatus are similarly actuated by the fluid power control unit 68 (FIG. 1).

It should be noted that in the stowed position seen in FIGS. 3A-C, the clamps 56 are in the locked position, also seen in FIG. 4A. As the lift cylinders 51 lower the turntable unit 42 from the stowed position, the clamps 56 remain in the locked position, and are located inside the rails 40 for defining the pressure point 80C. At the same time, when the clamps 56 are in the locked position, the locking brake bar 90 is held away from the wheel 58 by the side flap 86, thus permitting the wheels to rotate, except for the action of the pressure points 80A-C.

Figure 8:
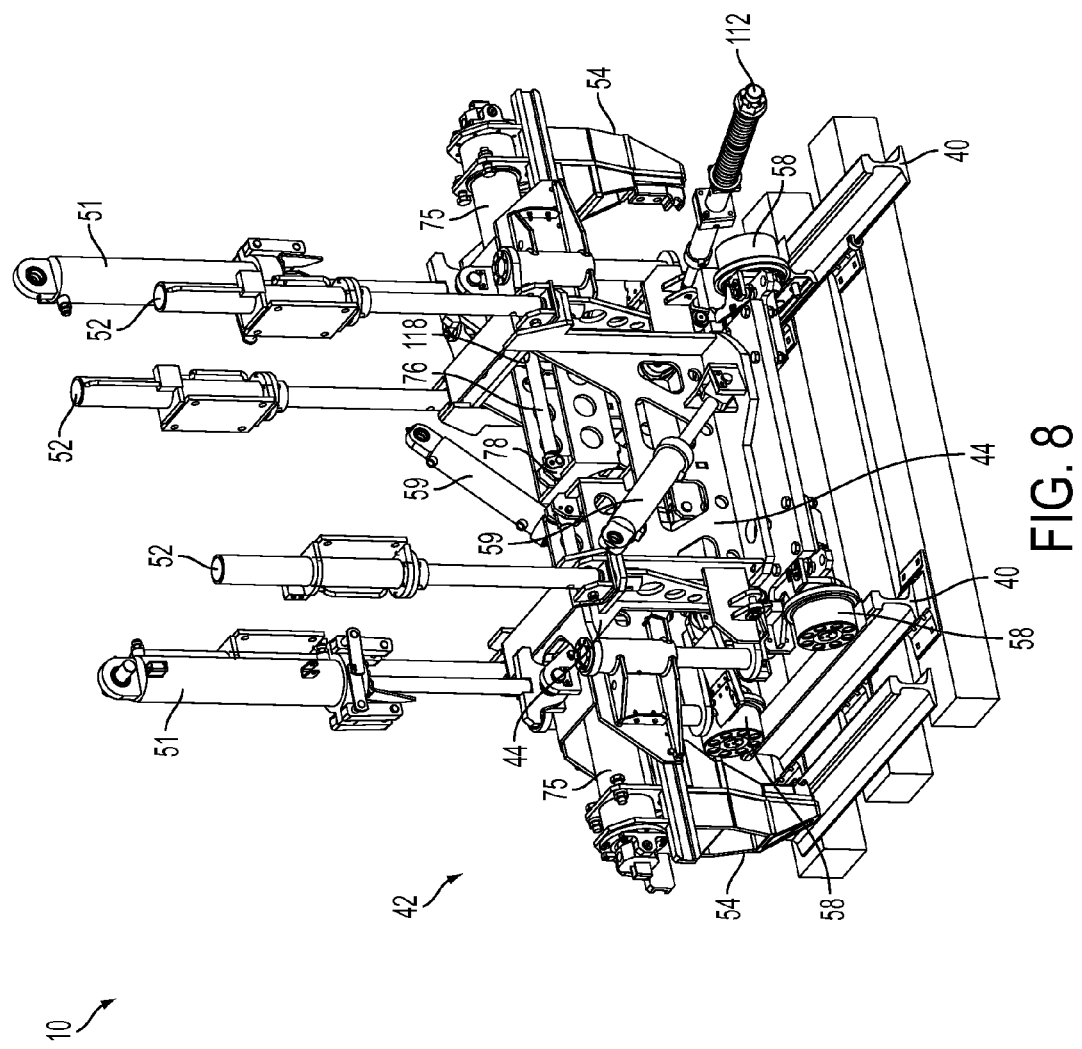
FIG. 8 is a fragmentary partial cross sectional front view of the turntable unit of FIG. 3A in a transition mode.
Figure 8A:
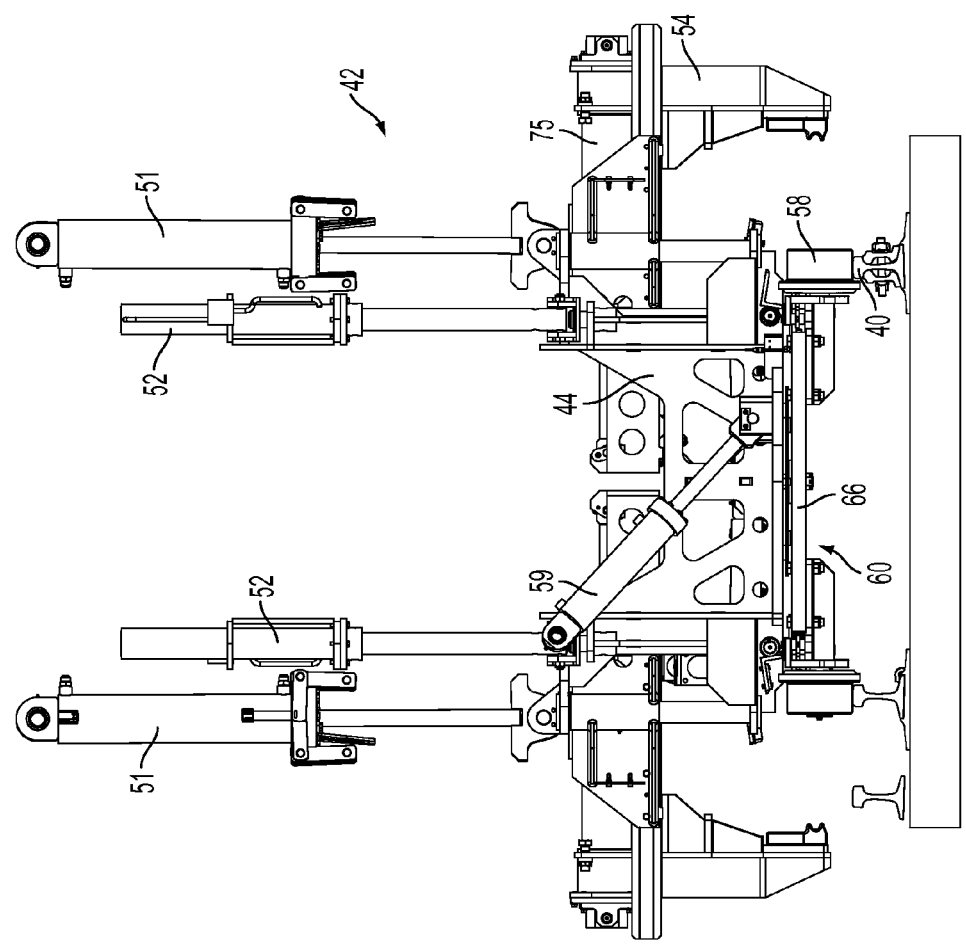
FIG. 8A is a fragmentary front view of the present turntable unit in a transition mode with the chassis shown transverse to the rails, featuring turntable cylinders.
Figure 8B:
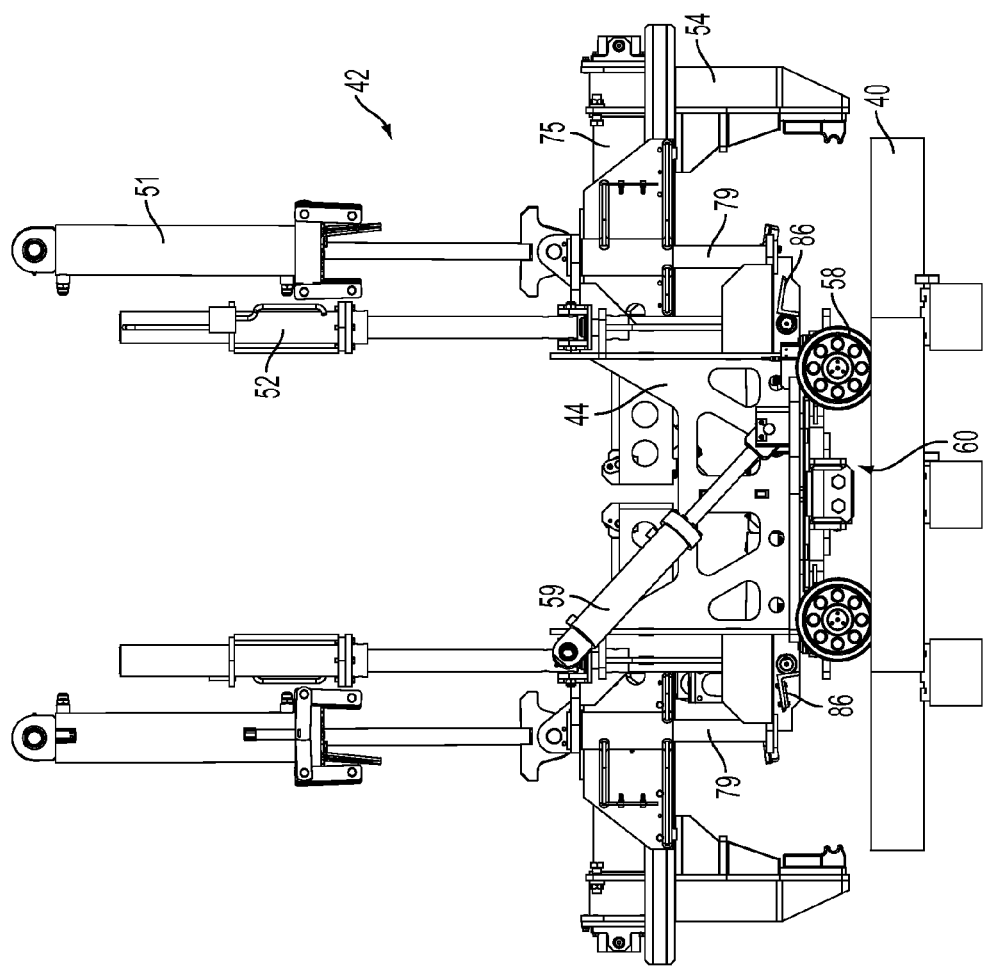
FIG. 8B is a fragmentary side view of the turntable unit of FIG. 8A with the chassis shown parallel to the rails in preparation for transition off the rails at road crossing.
Figure 9:
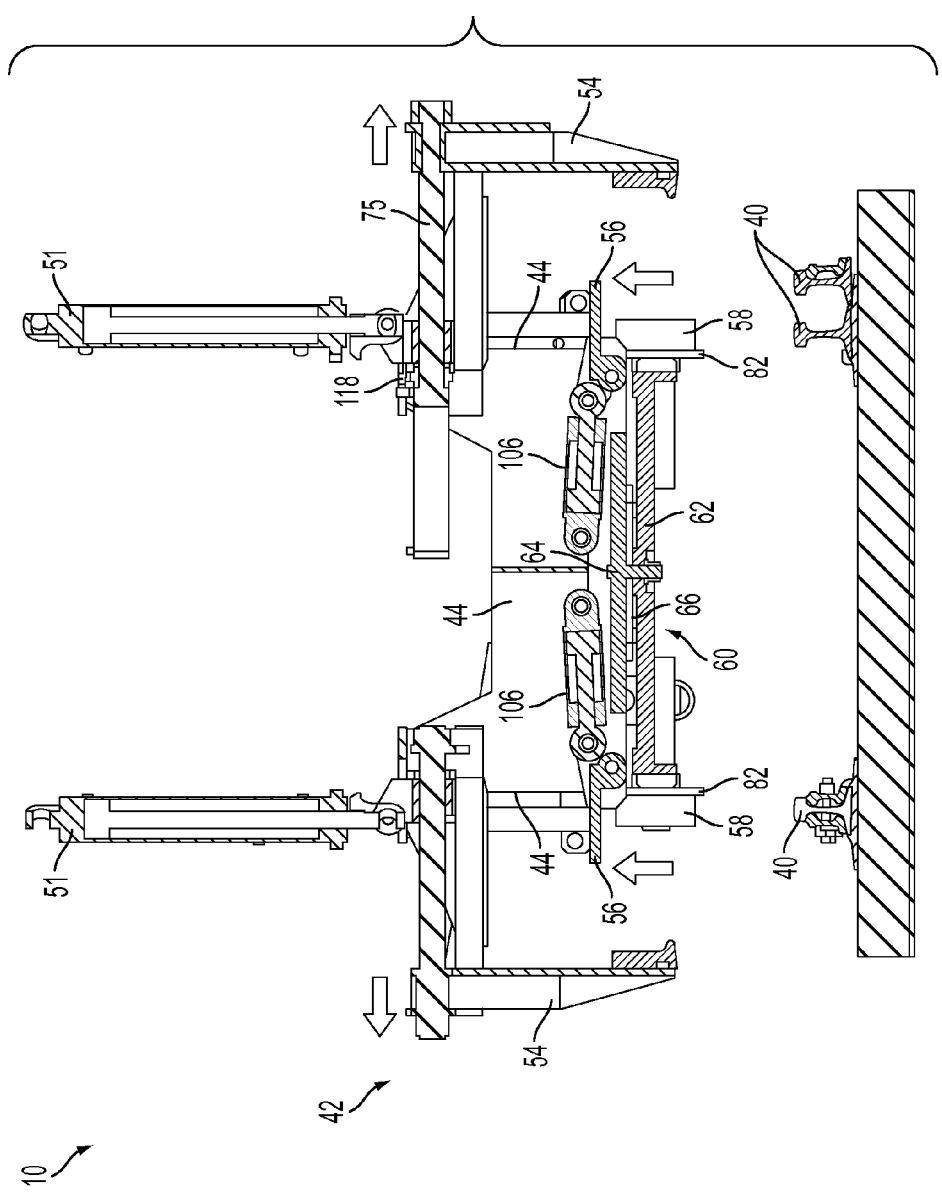
FIG. 9 is a fragmentary partial cross sectional front view of the turntable unit of FIG. 3A in the transition mode.

Referring now to FIGS. 8, 8A and 9, during the transition mode, as the turntable unit 42 is located upon the rails, and the chassis 38 eventually lowered into place, it is important that the hook members 54 do not contact the road or the surrounding terrain. To prevent such unwanted contact, in the transition mode, the lift cylinders 52 are pressurized to raise the hook members 54 to their full height. Next, the hook cylinders 75 are fully extended to place the hook members 54 laterally far away from the turntable unit 42. At the outermost position, a locking engagement is achieved between the cylinders 75 and a sidewall weldment as a locking pin 116 (FIG. 3A, 3C, 4A) on the cylinder matingly engages a corresponding opening 118 in the weldment to hold the hook member in position as shown in FIG. 8.

Returning now to FIGS. 4A-4B and 8A-B, the tamper apparatus 10 is shown in a full-lift mode. During the full-lift mode, the tamper apparatus 10 is manually aligned along the track and ready to be lowered to begin working after being transported along the rail in the stowed position of FIGS. 3A and 3B. The full-lift mode refers to a condition where the tamper apparatus 10 is fully lifted by the rail lift cylinders 51 while the apparatus is secured on the track for rotationally aligning the apparatus on the rails. During the transition mode, as the turntable unit 42 is being lowered into position onto the rails 40, when the tamper apparatus 10 is fully lifted under the action of the turntable cylinders 52, the chassis 38 is ready to be rotated manually in a radial direction about the rotation assembly 70 by laterally applying pressure on either side 110 of the chassis 38, thereby aligning the tamper apparatus in a direction along the rails 40 for traveling (FIG. 1).

Referring now to FIGS. 3B and 8A-8D, it is contemplated that at least one optional line cylinder 59 can be installed for stabilizing the turntable unit 42 from lateral movements during the manual rotation of the chassis 38, which is connected at one end to the outer surface of the wall 44 and at an opposite end to the chassis 38. Further, it is also contemplated that at least one slew cylinder 112 is installed to help further stabilize the chassis 38 from forward and reverse movements during the rotation, which is connected at one end to the outer surface of the wall 44 and at an opposite end to the chassis 38.

In operation, the present tamper apparatus 10 is towed by the tractor 12 over the highway until a desirable rail/ highway crossing is reached. The operator then enters the cab 70 and turns on the engine 16 so that the various systems on the apparatus 10 are operational. The turntable cylinders 52 lower the turntable unit 42 close to the rails 40, while the hook members 54 are locked in the outwardly projecting position of FIG. 9 through action of the hook cylinders 75. Also, the clamp members 56 are in the released position (FIGS. 8 and 9), to permit free movement of the turntable 60, so that the operator can easily align the auxiliary wheels 58 with the corresponding rails 40. At this time, the locking brake bar 90 is engaged against the wheels 58 to prevent their rotation.

Once the turntable 42 is in position on the rails 40, the tractor 12 is disengaged from the tamper apparatus 10, and the chassis 38 is lowered into position using the turntable cylinders 52. At this time, the front and rear axle wheels 22 and 24 are placed in engagement with the rails 40, and support the chassis 38 on the railroad track. Next, the turntable unit 42 is retracted upwards by the turntable cylinders 52 to the stowed position of FIGS. 3A and 3B. The apparatus 10 is now ready for high speed rail travel to a section of track needing tamping and aligning. In the stowed position, the clamp members 56 are in the locked position through action of the cylinders 106, preventing the turntable from rotating.

When the tamper apparatus reaches an area of track needing tamping and realigning, the tamper unit 42 is lowered from the stowed position to the working position shown in FIG. 4A using the rail lift cylinders 51. At this time, the turntable cylinders 52 are pinned in the retracted position (FIG. 8C) and are not employed. In this position, the clamping members 56 are selectively pressurized to secure the tamper unit 42 to the portion of rail needing realigning, using the pressure points 80A-C. The hook cylinders 75 and the rail lift cylinders 51 are then used in sequence to manipulate the hook members 54 to grasp the rail and lift it where needed. The tamper unit 34 is used as is known in the art to shift ballast to support the realigned rail. As the hook members 54 are grasping the rail, the clamp members 56 are in the locked position, so that the auxiliary wheels 58 are rotatable if the pressure points 80A-C are not in engaged. Upon completion of the working mode, the turntable unit 42 is retracted back into the stowed position to facilitate high speed rail travel to the next destination. When the present apparatus is finished with a portion of rail, it is re-mountable upon the tractor 12 for highway travel by reversing the steps described above.

While a particular embodiment of the present tamper apparatus has been described herein, it will be appreciated by those skilled in the art that changes and modifications may be made thereto without departing from the present disclosure in its broader aspects and as set forth in the following claims.

What is claimed is:

1. A tamper apparatus configured for being transportable upon a road by a tractor and being separable from the tractor for traveling on a railroad track, the tamper apparatus comprising:
   a chassis configured for supporting the tamper apparatus;
   a retractable turntable unit connected to and being retractable relative to the chassis, and having the chassis being rotatable relative to the turntable unit, the turntable unit being rotatably attached at substantially a center of mass of the tamper apparatus;
   a tamping unit connected to the chassis and configured for performing packing of a ballast under railroad ties for correcting cross and longitudinal levels of a pair of rails of a railroad track;
   a buggy lift assembly removably attached to the chassis and configured for providing alignment of the rails; and
   at least one set of retractable rail wheels connected to the chassis such that the chassis is towable by the tractor, the tamper apparatus having a weight of less than 80,000 pounds.

2. The tamper apparatus of claim 1, wherein the turntable unit has a turntable assembly having a turntable base and a turntable with at least one bearing disposed between the base and the turntable, such that the base is freely rotatable through 360 degrees relative to the turntable unit.

3. The tamper apparatus of claim 1, wherein the turntable unit is retractably connected to an upper portion of the chassis for enabling manual horizontal rotation of the tamper apparatus in a plane defined by the chassis relative to a vertical axis, such rotation being relative to the turntable unit.

4. The tamper apparatus of claim 1, wherein the turntable unit is selectively retractable relative to the chassis by at least one of turntable cylinders, and at least one of rail lift cylinders.

5. The tamper apparatus of claim 1, wherein the turntable unit has at least one retractable rail hook member that is movable in lateral and vertical directions.

6. The tamper apparatus of claim 1, wherein the turntable unit has at least one rail lift cylinder connected at one end to the chassis and at an opposite end to the side walls of the turntable unit for lifting the rails.

7. The tamper apparatus of claim 6, wherein at least one hook member is connected to the side walls of the turntable unit for holding the rails sufficient for vertical lifting of the rails with the at least one rail lift cylinder.

8. The tamper apparatus of claim 7, wherein at least one hook cylinder is connected at one end to a clevis flange disposed on an outer surface of the wall of the turntable unit, and at an opposite end to the at least one hook member, such that the hook cylinder selectively moves the at least one hook member reciprocally and laterally relative to the rails for grabbing the rails.

9. The tamper apparatus of claim 1, wherein the turn table unit has at least one turntable cylinder being connected at one end to the chassis and at an opposite end to the turntable unit for raising and lowering the turntable unit relative to the chassis.

10. The tamper apparatus of claim 1, wherein the turntable unit is selectively rotatable, and includes at least one clamp member for preventing turntable rotation, and for exerting a clamping force against an adjacent rail.

11. The tamper apparatus of claim 1, wherein at least one clamp member is provided for biasing against turntable wheels of the turntable unit sufficient for shifting a track line laterally under the action of a line cylinder.

12. The tamper apparatus of claim 11, wherein the at least one clamp member and opposite turntable wheels create three pressure points for securing the turntable unit relative to the rails.

13. The tamper apparatus of claim 1, further comprising a clamp member, connected to the turntable unit, having at least one outer center panel flap and at least one outer side panel flap for simultaneously pivoting downwardly about a shaft connecting the at least one outer center panel flap and the at least one outer side panel flap.

14. The tamper apparatus of claim 13, wherein the at least one outer center flap directly biases against an outer edge of the turntable unit, and the at least one side panel flap biases against a locking brake bar connected to the turntable unit.

15. The tamper apparatus of claim 14, wherein the locking brake bar has a protrusion portion being insertable into one of a plurality of slots located on an inner disk of a corresponding turntable wheel of the turntable unit for locking the corresponding turntable wheel.

16. The tamper apparatus of claim 14, wherein one end of the locking brake bar opposite a pivoting end of the brake bar is engaged by the at least one side flap for releasing a corresponding turntable wheel of the turntable unit.

17. The tamper apparatus of claim 1, wherein the tamper apparatus has the weight in the range of 62,000-64,000 pounds.

18. A roadworthy tamper apparatus comprising:
a turntable unit configured for adjustably rotating the tamper apparatus relative to the turntable unit while the tamper apparatus is placed in operation on a railroad track; and
a chassis holding the turntable unit at substantially a center of mass of the tamper apparatus, the center of mass being located at an upper portion of the chassis for facilitating horizontal rotation of the chassis of the tamper apparatus relative to the turntable unit,
wherein the turntable unit has at least one bearing configured so that the chassis is rotatable relative to the turntable unit, and is selectively retractable relative to the chassis by at least one turntable cylinder and at least one rail lift cylinder.

19. The roadworthy tamper apparatus of claim 18, wherein the turntable unit is retractably connected to an upper portion of the chassis for enabling manual horizontal rotation of the tamper apparatus in a plane defined by the chassis relative to a vertical axis, such rotation being relative to the turntable unit.

20. The roadworthy tamper apparatus of claim 18, wherein the turntable unit has a turntable base and a turntable with the at least one bearing disposed between the turntable base and the turntable, such that the turntable base is freely rotatable through 360 degrees relative to the turntable unit.

21. A tamper apparatus configured for being transportable upon a road by a tractor and being separable from the tractor for traveling on a railroad track, the tamper apparatus comprising:
a chassis configured for supporting the tamper apparatus;
a retractable turntable unit connected to and being retractable relative to the chassis, and having the chassis being rotatable relative to the turntable unit, the turntable unit being rotatably attached at substantially a center of mass of the tamper apparatus;
a tamping unit connected to the chassis and configured for performing packing of a ballast under railroad ties for correcting cross and longitudinal levels of a pair of rails of a railroad track;
a buggy lift assembly removably attached to the chassis and configured for providing track alignment of the rails; and
at least one set of retractable rail wheels connected to the chassis such that the chassis is towable by the tractor, the tamper apparatus having a width of less than or equal to 96 inches.

* * * * *